United States Patent
Hoy et al.

(10) Patent No.: US 9,912,477 B2
(45) Date of Patent: *Mar. 6, 2018

(54) USING EVERYDAY OBJECTS AS CRYPTOGRAPHIC KEYS

(71) Applicant: International Business Machines Corporation, Armonk, NY (US)

(72) Inventors: Jeffrey Robert Hoy, Southern Pines, NC (US); Sreekanth Ramakrishna Iyer, Bangalore (IN); Kaushal Kiran Kapadia, Pune (IN); Ravi Krishnan Muthukrishnan, Durham, NC (US); Nataraj Nagaratnam, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/671,531

(22) Filed: Aug. 8, 2017

(65) Prior Publication Data

US 2017/0353307 A1 Dec. 7, 2017

Related U.S. Application Data

(63) Continuation of application No. 14/875,124, filed on Oct. 5, 2015, now Pat. No. 9,729,318.

(51) Int. Cl.
*H04L 29/06* (2006.01)
*H04L 9/08* (2006.01)
*H04L 9/30* (2006.01)

(52) U.S. Cl.
CPC .......... *H04L 9/0869* (2013.01); *H04L 9/3006* (2013.01)

(58) Field of Classification Search
CPC .................................................. H04L 9/0869
See application file for complete search history.

(56) References Cited

U.S. PATENT DOCUMENTS

| | | | | |
|---|---|---|---|---|
| 8,260,262 | B2 * | 9/2012 | Ben Ayed | G08B 13/1436 455/41.2 |
| 8,935,769 | B2 * | 1/2015 | Hessler | H04L 63/0869 713/171 |
| 9,008,303 | B1 * | 4/2015 | Juels | 380/44 |
| 9,118,488 | B2 * | 8/2015 | Donaldson | G06F 21/83 |
| 9,436,335 | B1 * | 9/2016 | Scherer | G06F 3/044 |
| 9,548,865 | B2 * | 1/2017 | Hewitt | H04L 9/3234 |
| 2005/0036652 | A1 * | 2/2005 | Kesal | G06F 21/16 382/100 |

(Continued)

*Primary Examiner* — Ali Shayanfar
(74) *Attorney, Agent, or Firm* — Jeffrey S. LaBaw; David H. Judson

(57) ABSTRACT

This disclosure involves the notion of using physical objects to generate public key-based authenticators and, in particular, to use "everyday" physical objects to create a generator seed for a key generator that will use that seed to generate a key pair comprising a public key, and its associated private key. In a preferred approach, the physical object is used to create a digital representation (of the physical object) that, together with some uniqueness associated to the user, gives rise to a key generator seed value. Without knowledge of (a) the physical object itself, (b) how the physical object characteristic is converted (to a digital representation), and (c) the uniqueness value, an attacker cannot reproduce the key generator seed (or the key(s) generated from that seed).

20 Claims, 8 Drawing Sheets

(56) References Cited

U.S. PATENT DOCUMENTS

| | | | | |
|---|---|---|---|---|
| 2008/0301767 A1* | 12/2008 | Picard | ................... | G06T 1/0042 726/2 |
| 2009/0307748 A1* | 12/2009 | Blom | ...................... | G06F 21/31 726/2 |
| 2010/0268949 A1* | 10/2010 | Schuetze | ................. | H04L 9/002 713/168 |
| 2011/0119495 A1* | 5/2011 | Daoud | ................... | G06F 21/79 713/183 |
| 2013/0146487 A1* | 6/2013 | Macor | ................... | B65D 81/02 206/232 |
| 2014/0096215 A1* | 4/2014 | Hessler | ............... | H04L 63/0869 726/7 |
| 2015/0222604 A1* | 8/2015 | Ylonen | ................. | H04L 63/062 713/171 |
| 2015/0244699 A1* | 8/2015 | Hessler | ................ | H04W 12/06 726/7 |
| 2015/0358818 A1* | 12/2015 | Dipaola | ............. | G06Q 30/0261 726/4 |
| 2016/0092877 A1* | 3/2016 | Chew | ................ | G06Q 20/4012 705/72 |
| 2016/0350761 A1* | 12/2016 | Raziel | ............. | G06Q 20/40145 |

* cited by examiner

USING EVERYDAY OBJECTS AS CRYPTOGRAPHIC KEYS

BACKGROUND OF THE INVENTION

Technical Field

This disclosure relates generally to information security and, in particular, to access control schemes that are facilitated using authenticator devices.

Background of the Related Art

In August 2014, media reported 1.2 billion passwords had been stolen across a range of web services. Passwords have long been known to be insecure at multiple levels, yet there are a lack of secure, easy-to-use alternatives. Physical authenticators (e.g., security tokens, hardware tokens, USB authenticators, key fobs, and the like) provide a common, stronger alternative to overcome password limitations. Such devices have various implementations but, in general, they operate by providing two-factor authentication and stronger security qualities than human memory-based solutions, such as passwords. All physical authenticators, however, suffer from manufacturing and distribution drawbacks. Indeed, the costs of physical authenticators are prohibitive for most web services. For example, a banking website or social network cannot easily distribute authenticators to all its users. In rare cases, high-value web services will distribute authenticators. But, even if price were not an issue, it would be impractical for all web services to distribute to their users unique physical authenticators, as the number of physical devices would become unmanageable.

It is also known to use physical objects and environments as passkeys, for example, providing a physical token to unlock a smart lock. These approaches include techniques that create cryptographic protocols based in part on physical objects. Other known techniques involve using physical data (e.g., fingerprints and biometrics) to create a non-cryptographic encoding.

BRIEF SUMMARY

According to this disclosure, "everyday" physical objects are used as physical (e.g.., public key) authenticators to provide advantages of multifactor authentication, ease-of-use and public key cryptography, all while mitigating management and risk considerations.

According to one embodiment, a user selects a physical object to serve as an authenticator. The physical object may be of any type, e.g., a coin, a pen, a pair of glasses, a computer mouse, etc. Using a conversion system or device, a conversion of the selected object to a digital data stream is performed. The nature of the object-to-data stream conversion depends on the physical object selected, but preferably this conversion exhibits two properties: it is repeatable, and it exhibits high entropy (lack of predictability). Thus, if the object is a pair of glasses, the conversion may be a 3D capture of the object, with the resulting information then converted into the digital data stream. For repeatability, the capture must generate the same numerical value after many iterations, including possibly in different environment conditions. To ensure high entropy, preferably the conversion results in a relatively high number of significant digits in the captured data. For certain types of objects, repeatability and high entropy are provided by using multiple conversion operations. Thus, if the object is a coin, the conversion may involve first weighing the object and converting the weight to the digital data stream. Because the output of the scale may vary based on environmental conditions, however, a different conversion may be carried out (e.g., reflectivity). The necessary entropy may then be assured by combining the weight and reflectivity values to create an aggregate total of significant digits.

However it is formed, preferably the digital data stream is then augmented to include additional information that is context-specific. In this step, preferably some form of uniqueness is added to the digital stream, e.g., based on one or more attributes of the user, a user's device, a conversion device, the service desired to be accessed by the user, or the like. The result of augmenting the digital data stream with the additional context-specific information is a context-specific digital representation of the physical object. This digital representation is then fed into a key generator as a "seed" value to produce a key pair. Preferably, the key generator is a public key generator algorithm such that the key pair generated is a public key, and an associated private (secret) key. If the generated public key can be validated (e.g., in an authentication challenge) to match the public key, it is then available for use as an authenticator, e.g., in a conventional public key cryptographic protocol-secured operation.

Thus, according to a preferred embodiment of this disclosure, a public/private key pair is based on a digital representation of a physical object used as a generator seed.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
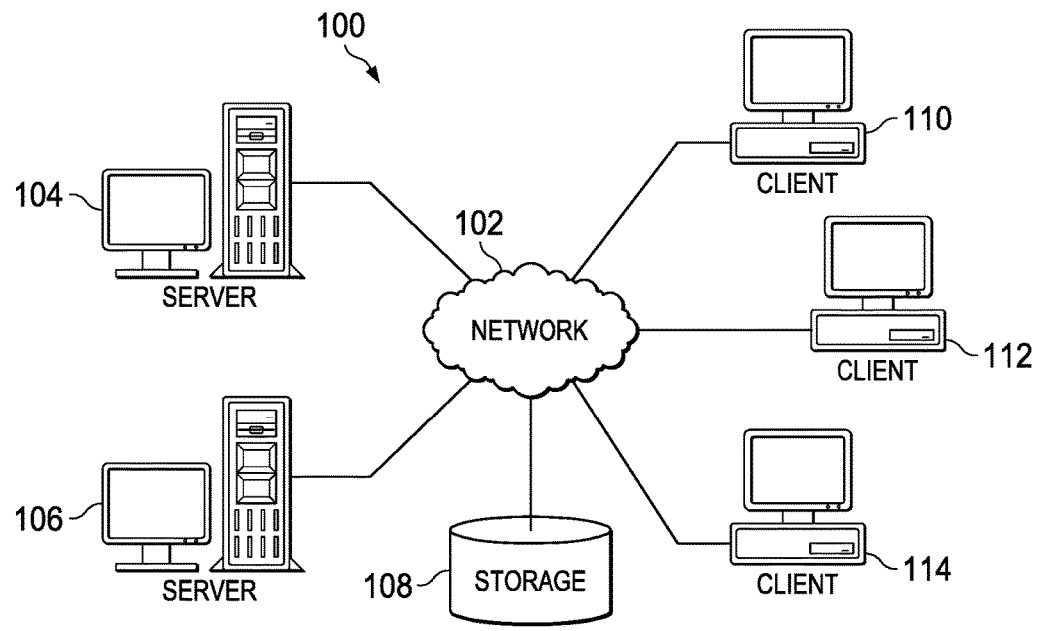
FIG. 1 depicts an exemplary block diagram of a distributed data processing environment in which exemplary aspects of the illustrative embodiments may be implemented.
Figure 2:
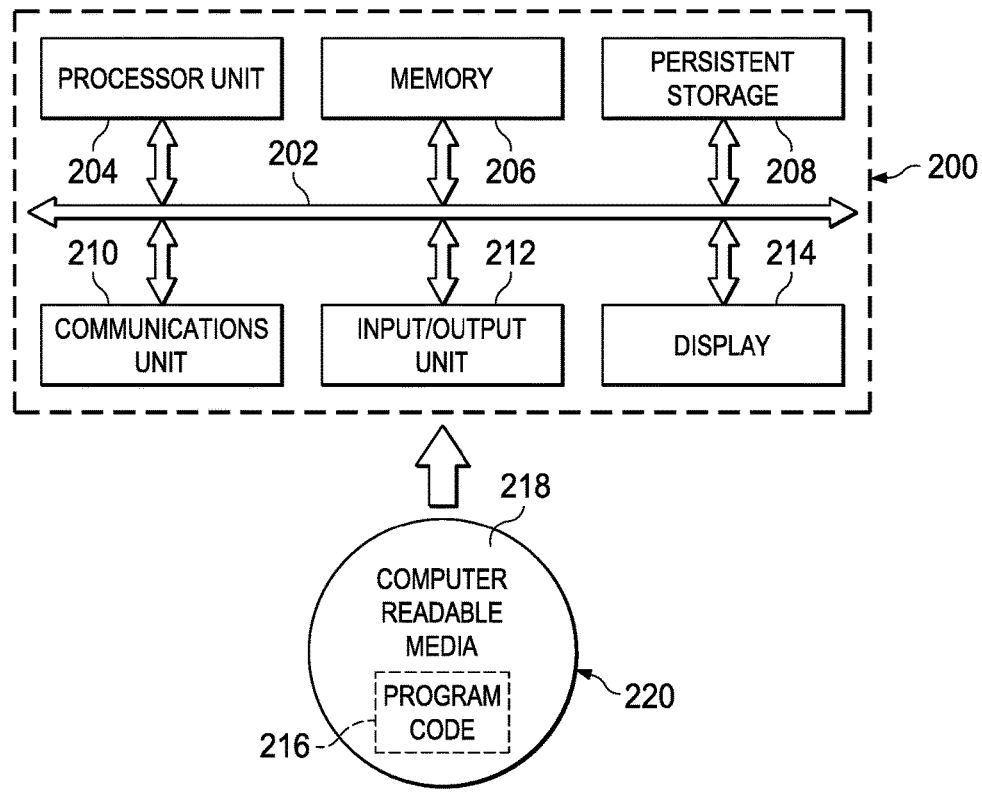
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-Server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Mobile Device Technologies

The recent past has seen an enormous growth in the usage and capabilities of mobile devices, such as smartphones, tablets, and the like. Such devices comprise fast processors, large amounts of memory, gesture-based multi-touch screens, and integrated multi-media and GPS hardware chips. Many of these devices use open mobile operating systems, such as Android. The ubiquity, performance and low cost of mobile devices have opened the door for creation of a large variety of mobile applications.

Figure 3:
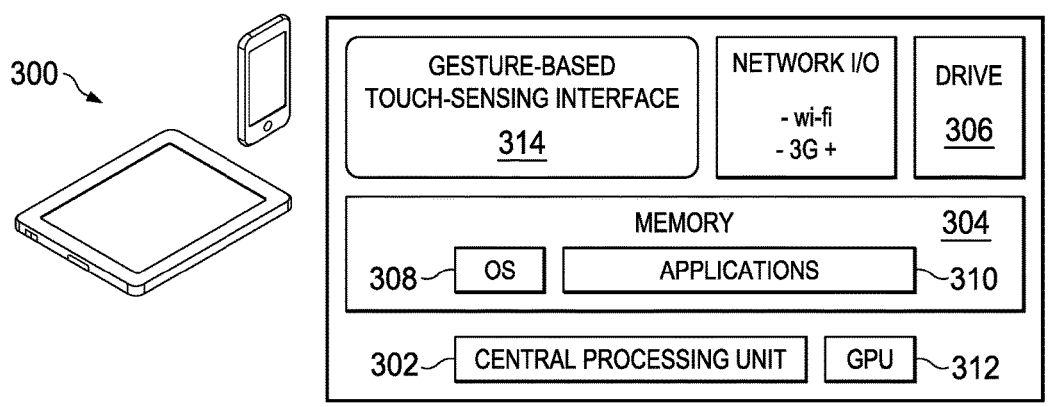
FIG. 3 illustrates a representative mobile device in which the disclosed subject matter may be implemented.

A mobile device is a smartphone or tablet, such as the iPhone® or iPad®, an Android™-based mobile device, or the like. As seen in FIG. 3, a device 300 of this type typically comprises a CPU 302, computer memory 304, such as RAM, and a data store 306. The device software includes operating system (e.g., Apple iOS, Android, Blackberry OS, or the like) 308, and generic support applications and utilities 310. Typically, the device includes a separate graphics processing unit (GPU) 312. A touch-sensing device or interface 314, such as a touch screen, is configured to receive input from a user's touch and to send this information to processor 312. The interface 314 responds to gestures on the touch sensitive surface. Other input/output devices include software-based keyboards or keypads, cameras, microphones, and the like.

For example, a mobile device as used herein is a 3G-(or next generation) compliant device that may include a subscriber identity module (SIM), which is a smart card that carries subscriber-specific information, mobile equipment (e.g., radio and associated signal processing devices), a man-machine interface (MMI), and one or more interfaces to external devices. The techniques disclosed herein are not limited for use with a mobile device that uses a particular access protocol. The mobile device typically also has support for wireless local area network (WLAN) technologies, such as Wi-Fi. WLAN is based on IEEE 802.11 standards.

Generalizing, the mobile device is any wireless client device, e.g., a smartphone, a tablet, a personal digital assistant (PDA, e.g., with GPRS or WiFi-based NIC), a mobile computer with a smartphone or tablet-like client, or the like. Other mobile devices in which the technique may be practiced include any access protocol-enabled device (e.g., a Blackberry® device, an Android™-based device, or the like) that is capable of sending and receiving data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

Typically, computing devices such as described also implement networking technology for exchanging data over short distances, such as Bluetooth, which is a wireless technology standard that uses short-wavelength UHF radio waves in the ISM band from 2.4 to 2.485 GHz). Devices that implement Bluetooth can create personal area networks (PANs). Bluetooth can connect to several devices at once. Alternatives to Bluetooth include, without limitation, Near Field Communication (NFC), ultra wideband, induction wireless, and others.

The underlying network transport may be any communication medium including, without limitation, cellular, wireless, Wi-Fi, small cell (e.g., Femto), and combinations thereof.

Public Key Cryptography and Digital Certificates

Public-key cryptography (PKC) is a cryptographic approach that involves the use of asymmetric key algorithms. Unlike symmetric key algorithms, PKC does not require a secure initial exchange of one or more secret keys to both sender and receiver. The asymmetric key algorithms are used to create a mathematically-related key pair: a secret private key, and a published public key. Use of these keys allows protection of the authenticity of a message by creating a digital signature of a message using the private key, which can be verified using the public key. It also allows protection of the confidentiality and integrity of a message, by public key encryption, encrypting the message using the public key, which can only be decrypted using the private key.

Key generation is the process of generating keys for cryptography. Modern cryptographic systems include symmetric-key algorithms (e.g., DES, AES and others) and public-key algorithms (e.g., RSA, D-H, EDH, and others). Symmetric-key algorithms use a single shared key; data secrecy is maintained provided the single key is kept private. Public-key algorithms use key pairs consisting of a public key and a private key. The public key is made available to anyone, typically by means of a digital certificate. A sender encrypts data with the public key; only the holder of the private key can decrypt this data. Typically, computers use integers for keys. Keys may also be randomly generated using a random number generator (RNG) or pseudorandom number generator (PRNG). A PRNG is an algorithm that produces data that appears random under analysis. PRNGs that use system entropy to seed data generally produce better results, because this makes the initial conditions of the PRNG much more difficult for an attacker to guess. In other situations, the key is derived deterministically, e.g., using a key derivation function (KDF). A KDF typically uses a pseudo-random function to derive one or more secret keys from a secret value, such as a master key, a password or passphrase.

More generally, public key cryptography is useful for privacy (through encryption), and for authentication (using digital signatures). Encryption is the transformation of data into a form unreadable by anyone without a secret decryption key; encryption ensures privacy by keeping the content of the information hidden from anyone for whom it is not intended, even those who can see the encrypted data. Authentication is a process whereby the receiver of a digital message is assured of the identity of the sender and/or the integrity of the message. As an example (of both privacy and authentication), when a sender encrypts a message, the public key of the receiver is used to transform the data within the original message into the contents of the encrypted message. A sender uses a public key of the intended recipient to encrypt data, and the receiver uses its private key to decrypt the encrypted message. When authenticating data, data can be signed by computing a digital signature from the data using the private key of the signer. Once the data is digitally signed, it can be stored with the identity of the signer, and the signature then proves that the data originated from the signer. A signer uses its private key to sign data, and a receiver uses the public key of the signer to verify the signature.

A certificate is a digital document that vouches for the identity and ownership of a cryptographic key by a particular entity, such as an individual, a computer system, a specific server running on that system, or the like. Certificates are issued by certificate authorities. A certificate authority (CA) is an entity, usually a trusted third party to a transaction, which is trusted to sign or issue certificates for other people or entities. Typically, the CA assumes a legal responsibility for its vouching of the binding between a public key and its owner to allow one to trust the entity that signed a certificate. There are many commercial certificate authorities; these authorities are responsible for verifying the identity and key ownership of an entity when issuing the certificate. If a CA issues a certificate for an entity, the entity must provide a public key and some information about the entity. A software tool, e.g., a web browser, may digitally sign this information and send it to the certificate authority. The certificate authority might be a commercial company that provides trusted third-party certificate authority services. The CA creates a digital certificate by embedding (in the certificate) the requesting entity's public key, typically along with other identifying information, and then signing the digital certificate with the certificate authority's private key. Anyone who receives the digital certificate during a transaction or communication can then use the public key of the certificate authority to verify the signed public key within the certificate. The intention is that the certificate authority's signature acts as a tamper-proof seal on the digital certificate, thereby assuring the integrity of the data in the certificate.

Public key cryptosystems may be implemented in whole or in part with physical authenticators, which may be used to carry or protect a key. These physical authenticators include, for example, security tokens, hardware tokens, USB authenticators, key fobs, and the like, to carry a key. Such devices provide for cryptographic-based two-factor authentication (2FA). Two-factor authentication provides identification of users by means of the combination of two different components. These components may be something that the user knows, something that the user possesses or something that is inseparable from the user.

Using an Everyday Physical Object as a Seed to Generate a Public Key

With the above as background, the subject matter of this disclosure is now described. As described above, generally the technique of this disclosure involves the notion of using physical objects to generate physical (e.g., public key-based) authenticators and, in particular, to use "everyday" physical objects to create a generator seed for a key generator that will use that seed to generate a key pair comprising a public key, and its associated private key. In a preferred approach, the physical object is used to create a digital representation (of the physical object) that, together with some uniqueness associated to the user, gives rise to a key generator seed value. Without knowledge of (a) the physical object itself, (b) how the physical object characteristic is converted (to a digital representation), and (c) the uniqueness value, an attacker cannot reproduce the key generator seed (or the key(s) generated from that seed).

Figure 4:
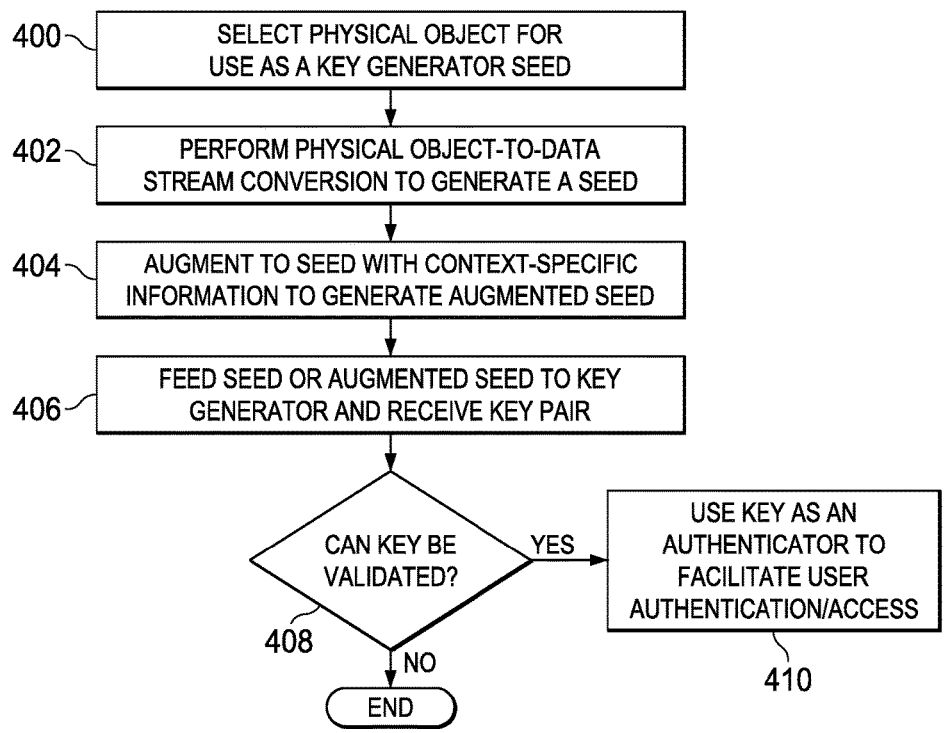
FIG. 4 depicts a process flow according to this disclosure.

FIG. 4 depicts the basic process flow of this technique according to an embodiment. At step 400, a user selects a physical object to serve as an authenticator. The physical object may be of any type, e.g., a coin, a pen, a pair of glasses, a computer mouse, etc. At step 402, and using a conversion system or device, a conversion of the selected object to a digital data stream is performed. The nature of the object-to-data stream conversion carried out depends on the physical object selected, but preferably this conversion represented at step 402 exhibits two (2) properties: it is repeatable, and it exhibits high entropy (lack of predictability). For repeatability, the capture must generate the same numerical value after many iterations, including possibly in different environment conditions. To ensure high entropy, preferably the conversion results in a relatively high number of significant digits in the captured data. Step 402 may include one or more iterations. Thus, for certain types of objects, repeatability and high entropy are provided by using multiple conversion operations. The output of step 402 typically is one or more physical object parameters that are sensed from the physical object.

At step 404, the digital data stream generated from the physical object-to-data stream conversion preferably is then augmented to include additional information that, preferably is context-specific. In this step, preferably some form of uniqueness is added to the digital stream, e.g., based on one or more attributes of the user, a user's device, a conversion device, the service desired to be accessed by the user, or the like. As used herein, "augmenting" may include various operations including, without limitation, one or more mathematical operations, concatenation, or application of one or more processing functions. The notion of "augmenting" is sometimes referred to herein as "salting." The result of augmenting the digital data stream with the additional context-specific information in step 404 then is a context-specific digital representation of the physical object.

At step 406, this digital representation is fed into a key generator as a "seed" value to produce a key pair. The seed value is sometimes referred to herein as a "token" or "digital token." Typically, the key generator is a public key generator algorithm such that the key generated is a public key of a key pair comprising the public key and an associated private (secret) key. At step 408, a test is performed to determine if the generated key can be validated (e.g., in an authentication challenge) to match the public key. Step 408 is optional. If the outcome of the test at step 408 is positive, then the key is provided to the user (or the user's device) as an authenticator. At step 410, a conventional public key cryptographic protocol-secured operation is carried out using the key that has been generated in this manner.

In certain circumstances, step 404 may be optional such that the key pair may be generated solely from the output of the physical object-to-data stream conversion itself. Typically, however, the context-specific information will be used as well.

In this manner, and according to this disclosure, a public/private key pair is based on a digital representation of a physical object used as a key generator seed.

It should be appreciated that the type of physical object that is used for the seed value (and thus the key generation) herein may be quite varied. As used herein, preferably a "physical" object is an everyday item in the user's environment. The notion of "everyday" is not intended to be limiting. Typically, the item is owned (or otherwise possessed) by the user and can be readily adapted for the purposes herein. The identity and nature of the physical object preferably is known only to the user, or to persons or entities that are trusted by the user. An object of this type typically is a 3D item, but it need not be. An object (e.g., a photo, an email, a text message, a chat log, etc.) that is purely "digital" in nature (by virtue of being digitally created or stored) may be deemed a physical object as well.

The following describes several different embodiments of the above-described technique for using everyday objects as authenticators, each increasing in complexity and security strength. These example scenarios are not intended to be limiting.

Figure 5:
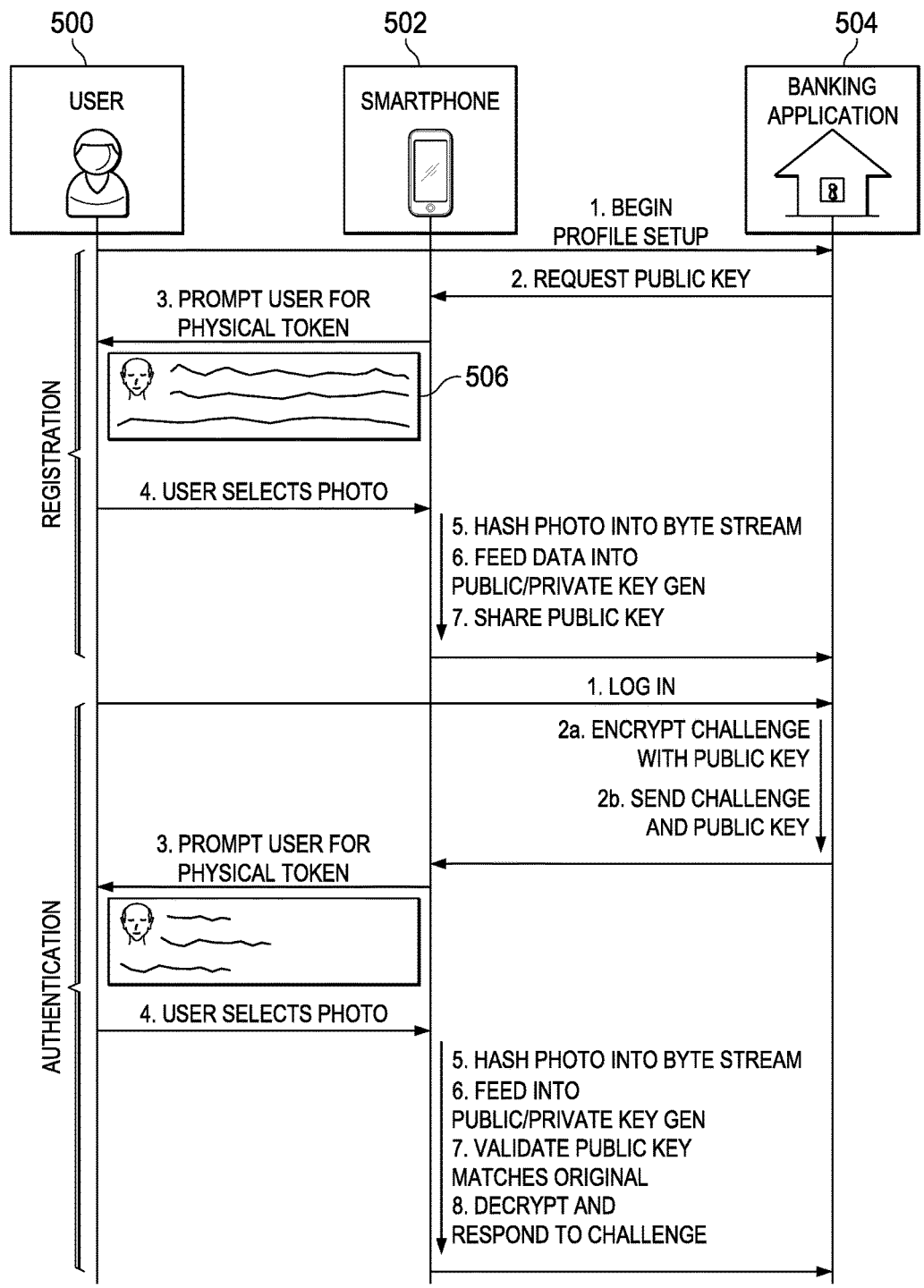
FIG. 5 depicts a first "digital-only" example scenario of the method of this disclosure.

FIG. 5 involves a first "digital-only" scenario wherein a user 500 having a mobile device 502 desires to interact with a remote application, e.g., a secure web-based application 504 executing in the user's financial instruction. Although not shown, it is assumed that security protocols and infrastructure are established in the usual manner. The user 500 has some privately-owned digital object 506 that he or she will use as a public key authenticator according to this disclosure. Thus, for example, the object 506 may be a photo, a chat log, an email, or the like, that is available to the user on the user's mobile device 502. As described above, preferably identity and nature of the object 506 is known only to the user 500, or persons or entities that are trusted by the user. This embodiment also assumes that the user's mobile device executes a mobile app (or other native code) that interacts with the application 504, typically over a channel or link that is secure.

As depicted, typically the user first "registers" with the banking application; once registered, the user can "authenticate" himself or herself to the application. These two operations are depicted here as happening during a particular transaction, but this is not a limitation, as the registration operation (that utilizes the technique of this disclosure) may occur off-line or in some pre-processing environment.

During the registration process, the user's physical object will be used to generate a seed value that, in turn, is used to generate a public/private key pair that can then be used to facilitate the authentication operation. To that end, registration begins at step (1) with the user 500 requesting establishment (setup) of a profile with the application 504. At step (2), the application 504 issues a request to the user's mobile device app for a public key that is expected by the application. To obtain the public key, and at step (3), the mobile device app prompts the user for a physical object. In response, and at step (4), the user selects one or his or her photos (which one is kept private to the user). The mobile device app receives the selection, converts the selected photo in a digital data stream and, at step (5) generates a "hash" of the photo. This object-to-data stream conversion exhibits the properties of being repeatable (if the identity of the photo is known of course) and exhibits high entropy. A hash may be generated by applying a cryptographic hash function (e.g., MD5, SHA-1, or the like) to the digital data stream comprising the selected photo. The result of applying the hash function is the generator seed value (sometimes referred to herein as a "digital token") that will be used for key generation. To that end, and at step (6), the seed value is fed into a key generator, e.g., a RNG/PRNG executing in the mobile app. Any generator function may be used to create the key pair. The result of step (6) generates the user's key pair (including the public key and its associated private key). At step (7), the public key is then transmitted to the application that requested it. The private key that is generated (using the physical object to create the seed value) is maintained in the mobile phone in a highly-secured manner (e.g., in trusted hardware, in a secure portion of memory, etc.). This completes the registration process.

To authenticate, at step (1), the user 500 logs into the application 504. This login may occur over an SSL/TLS-secured channel. As part of this login, and at step 2(a), an encryption challenge is initiated. At step 2(b), the application 504 issues a challenge to the mobile app, passing back the public key. The challenge asks that mobile app to verify (or produce a verification) that it can produce (i.e. recreate) the public key independently. Thus, at step (3), the mobile app again issues a prompt to the user for the physical object (and, in particular, the digital token). The user then selects the same photo that was used for the original registration. This is step (4). At step (5), the mobile app uses the hash function to hash the selected photo in a byte stream. The byte stream is then feed back into the public/private key generator at step (6). The public key that results from this operation is then compared with the public key provided by the application 404. This is step (7). If there is a match, the mobile app continues at step (8) to decrypt the public key and respond to the challenge. If the process succeeds, the user is authenticated to use the application 404.

This scenario has several advantages over passwords and physical authenticators in that the user only needs to remember which photo was selected. A photo typically includes much more entropy than a password, and the photo and the corresponding private key can remain under the user's ownership, potentially never leaving the device. Preferably, the private key is only stored for a short time period, and it need not be persisted after authentication to reduce an attack surface. When the private key is needed later, e.g., for another authentication, the user just provides the digital token again. The above said, the scenario is not highly secure, but the photo may have already been shared (e.g., on a social network), or because malware on the device may be capable of intercepting the private key during processing or otherwise retrieve the digital token. To obtain enhanced security, other more preferred operating scenarios may be implemented, as now explained.

Figure 6:
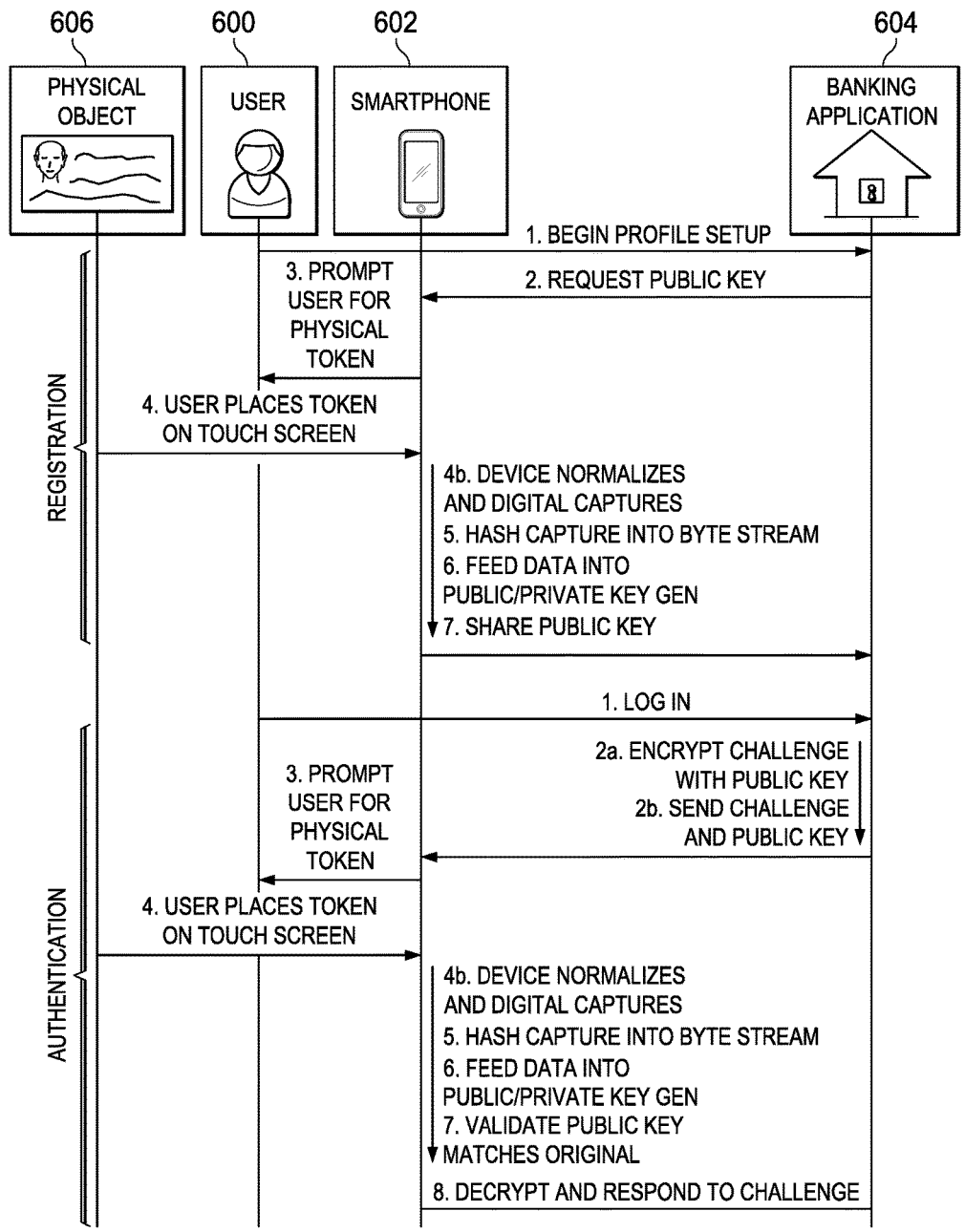
FIG. 6 depicts a privately-owned physical object scenario of the method of this disclosure.

Referring to FIG. 6, the user uses a privately-owned physical object (instead of a purely digital object) as a public key authenticator. Representative physical objects may be those in the user's immediate vicinity, e.g., the user's wallet, the user's wireless mouse, a shoe currently being worn, a clock on a desk at the user's office, a monitor on the desk, the user's keys and keychain, etc. Representative physical objects may be objects that the user specifically chooses and even carries as an authenticator; example objects of this type might be a rare coin, a marble, a large paperclip, a piece of scrap metal, a paperweight, a guitar pick, a ball bearing, etc. These examples are not intended to be limiting. In this scenario, it is assumed that the user possesses or has access to some digital capture device or system that provides the object-to-data stream conversion, and that results in a high entropy data stream. The type of conversion system or device will depend on the nature of the conversion itself. For example, the conversion system may be a weighing scale, a camera, a 3D capture device. These functions may be implemented in some other device (e.g., a mobile device or tablet). An appropriate conversion system or device may be equipped with other sensors and can capture other data from the physical object, e.g. based on weight, color, size, 3D wireframe, 2D profile, etc. The capture can also be context-specific, and it may use different techniques for different environments. As noted above, the capture can also combine multiple techniques, for example, to combine size and weight of the physical object. The only requirements for capture is that the digital representation is reproducible based on the physical object, and that the resulting data stream exhibit sufficiently high entropy.

FIG. 6 involves the physical object scenario wherein a user 600 having a mobile device 602 desires to interact with a remote application, e.g., a secure web-based application 604 executing in the user's financial instruction. Once again, it is assumed that security protocols and infrastructure are established in the usual manner. The user 600 has some privately-owned physical object 606 that he or she will use as a public key authenticator according to this disclosure. Preferably, the identity and nature of the object 606 is known only to the user 600, or persons or entities that are trusted by the user. This embodiment also assumes that the user's mobile device executes a mobile app (or other native code) that interacts with the application 604, typically over a channel or link that is secure.

As depicted, typically the user first "registers" with the banking application; once registered, the user can "authenticate" himself or herself to the application. These two operations are depicted here as happening during a particular transaction, but once again this is not a limitation, as the registration operation (that utilizes the technique of this disclosure) may occur off-line or in some pre-processing environment.

During the registration process, the user's physical object will be used to generate a seed value that, in turn, is used to generate a public/private key pair that can then be used to facilitate the authentication operation. To that end, registration begins at step (1) with the user 600 requesting establishment (setup) of a profile with the application 604. At step (2), the application 604 issues a request to the user's mobile device app for a public key that is expected by the application. To obtain the public key, and at step (3), the mobile device app prompts the user for a token (that will be derived from the user's physical object). In response, and at step (4a), the user places the physical object on the device touch screen. At step (4b), the device normalizes the object and performs a digital capture operation. At step (5), the mobile device app receives the result of the capture operation and generates a "hash" of the capture data. This object-to-data stream conversion exhibits the properties of being repeatable (if the identity of the physical object is known) and exhibits high entropy. The result of applying the hash function is the generator seed value that will be used for key generation. To that end, and at step (6), the seed value is fed into a key generator, e.g., a RNG/PRNG executing in the mobile app. The result of step (6) generates the user's key pair (including the public key and its associated private key). At step (7), the public key is then transmitted to the application that requested it. The private key generated (using the physical object to create the seed value) is maintained in the device. This completes the registration process.

To authenticate, at step (1), the user 600 logs into the application 604. This login may occur over an SSL/TLS-secured channel. As part of this login, and at step 2(a), an encryption challenge is initiated. At step 2(b), the application 604 issues a challenge to the mobile app, passing back the public key. The challenge asks that mobile app to verify (or produce a verification) that it can produce (i.e. recreate) the public key independently. Thus, at step (3), the mobile app again issues a prompt to the user for the physical object (and, in particular, the digital token). The user then retrieves the physical object 606 that was used for the original registration and places it on the device touch screen. This is step (4a). At step 4(b), the device normalizes the object and performs the digital capture. At step (5), the mobile app uses the hash function to hash the capture data in a byte stream. The hash function must be the same function used during the registration process (if the authentication challenge is to succeed). The byte stream is then feed back into the public/private key generator at step (6). The public key that results from this operation is then compared with the public key provided by the application 604. This is step (7). If there is a match, the mobile app continues at step (8) to decrypt the public key (provided by the application 604) and respond to the challenge. If the process succeeds, the user is authenticated to use the application 604.

The scenario in FIG. 6 has advantages over the prior embodiment (in FIG. 5) in that only the user knows his or her choice of physical object (and can easily remember it), and preferably only the user has access to the object. In this embodiment, even theft of the mobile device need not compromise the scheme, although malware on the device could still intercept the private key during processing. To alleviate that concern, the approach in FIG. 7 may be implemented.

In this scenario, a privately-owned physical object is used in combination with a standalone secure public key authenticator generator device. In this case, the key module for authentication is a distinct hardware device that attaches to the user's authentication device (e.g., the mobile device). Responsibility for key generation is then off-loaded from the user's device to the distinct key module. The steps remain generally the same as the example scenario in FIG. 6, with the exception that the mobile device itself preferably never has access to the generated private key. Additional security controls also may be embedded into the key module (e.g., leveraging controls used in existing authenticator devices) to prevent leakage of the private key.

Figure 7:
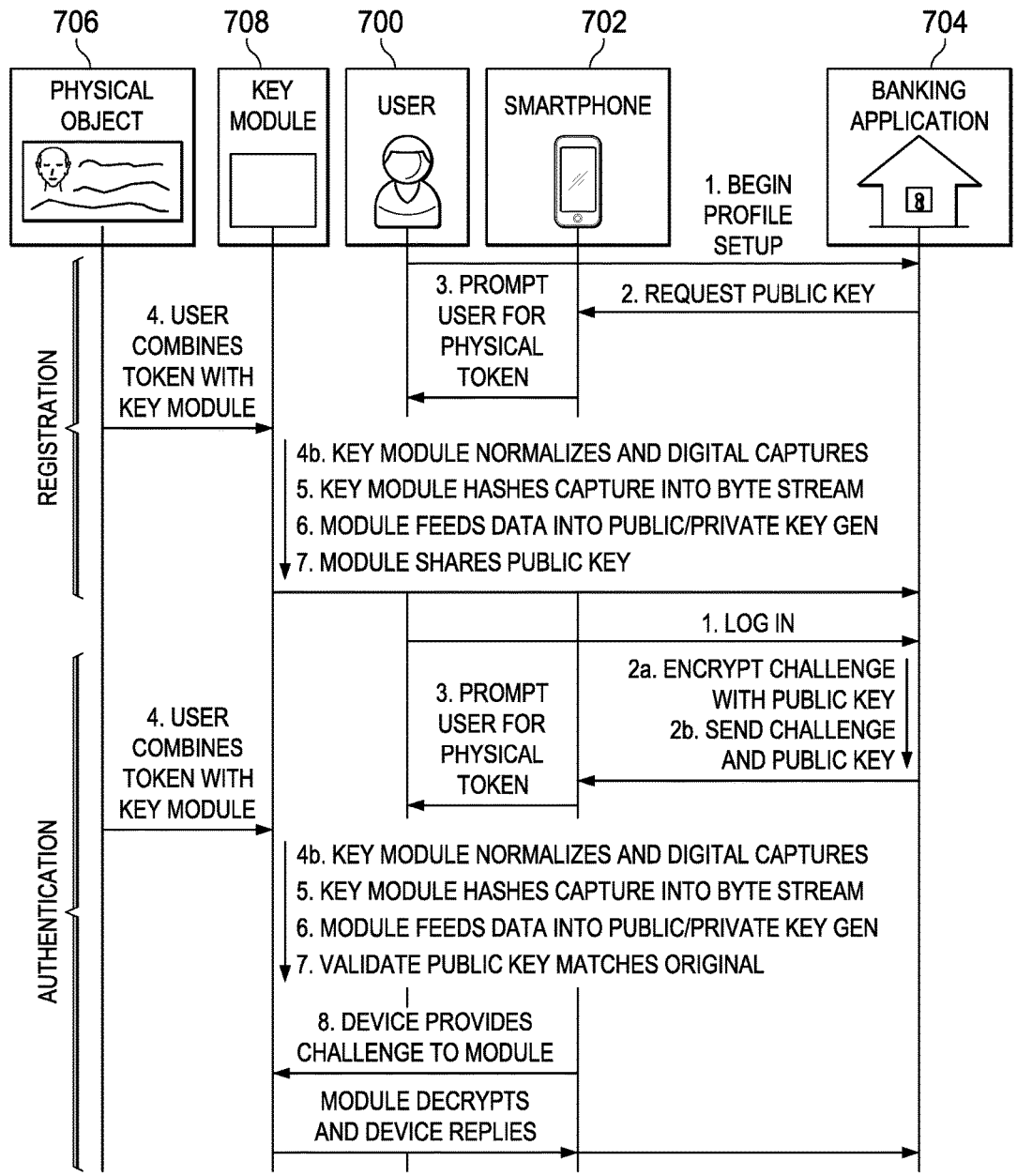
FIG. 7 depicts a privately-owned physical object, mobile device and key module scenario of the method of this disclosure.

FIG. 7 involves the physical object scenario wherein a user 700 having a mobile device 702 desires to interact with a remote application, e.g., a secure web-based application 704 executing in the user's financial instruction. Once again, it is assumed that security protocols and infrastructure are established in the usual manner. The user 700 has some privately-owned physical object 706 that he or she will use as a public key authenticator according to this disclosure. The user also possesses a key module 708.

As depicted, typically the user first "registers" with the remote application; once registered, the user can "authenticate" himself or herself to the application.

During the registration process, the user's physical object will be used (by the key module 708) to generate a seed value that, in turn, is used to generate a public/private key pair that can then be used to facilitate the authentication operation. To that end, registration begins at step (1) with the user 700 requesting establishment (setup) of a profile with the application 704. At step (2), the application 704 issues a request to the user's mobile device app for a public key that is expected by the application. To obtain the public key, and at step (3), the mobile device app prompts the user for a token (that will be derived from the user's physical object). In response, and at step (4a), the user combines the token with the key module 708. At step (4b), the key module normalizes and performs a digital capture operation with respect to the physical object. At step (5), the key module receives the result of the capture operation and generates a "hash" of the capture data. As noted previously, this object-to-data stream conversion exhibits the properties of being repeatable (if the identity of the physical object is known) and exhibits high entropy. The result of applying the hash function is the generator seed value that will be used for key generation. To that end, and at step (6), the seed value is fed into the key generator, e.g., a RNG/PRNG executing in the key module. The result of step (6) generates the user's key pair (including the public key and its associated private key). At step (7), the public key is then transmitted by the key module to the application that requested it. The private key generated (using the physical object to create the seed value) is maintained in the device. This completes the registration process.

As one of ordinary skill will appreciate, steps (4)-(7) in the registration process deal with generating public/private keys. More specifically, in step (4), the physical token is appended to the numbers generated by the random number generator/crypto-processor within the key module. To facilitate this process, the user either enters information (a soft token) to be sent to the key module manually, or there may be capture of the physical token, which can then be image-processed to determine the soft token to be sent to the key module.

To authenticate, at step (1), the user 700 logs into the application 704. As part of this login, and at step 2(a), an encryption challenge is initiated. At step 2(b), the application 704 issues a challenge to the mobile app, passing back the public key. The challenge asks that mobile app to verify (or produce a verification) that it can produce (i.e. recreate) the public key independently. Thus, at step (3), the mobile app again issues a prompt to the user for the physical object (and, in particular, the digital token). The user then retrieves the physical object 706 that was used for the original registration and combines it with the key module. This is step (4a). At step 4(b), the key module normalizes the token and performs the digital capture. At step (5), the key module uses the hash function to hash the capture data in a byte stream. Once again, the hash function must be the same function used during the registration process (if the authentication challenge is to succeed). The byte stream is then feed back into the public/private key generator of the key module at step (6). The public key that results from this operation is then compared with the public key provided by the application 704. This operation occurs in the key module and is step (7). If there is a match, the mobile app continues at step (8) to issue a separate challenge to the key module, passing the public key that it, the mobile app, original received from the application 704 in step 2(b) of the authentication. At step (9), the key module decrypts the public key (forwarded by the mobile app in step (8)) and responds to the challenge. If the process succeeds, the user is authenticated to use the application 704.

This scenario has an advantage over the prior embodiments because even malware on the user's mobile device has no opportunity to intercept the user's private key. While this scenario does require an additional key module (whereas the prior solution does not), the key module can be used for generation of many keys, so presumably the user would only ever need one. The key module can further be combined with advanced physical data capture, to allow for greater utility and reliability of the object capture. In a variant, the key module is provided as an embedded technology in the mobile device itself.

Figure 8:
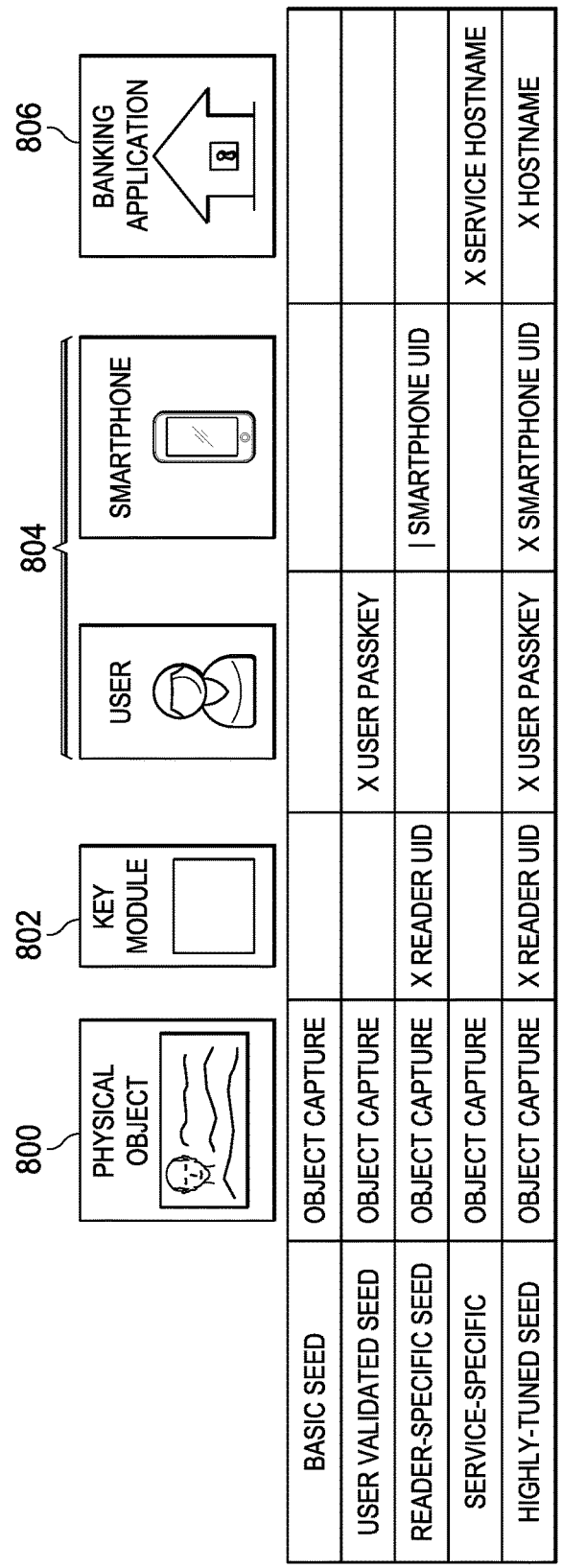
FIG. 8 depicts several "seed" variants according to this disclosure.

Thus, according to this disclosure, a public/private key pair is generated based on a digital representation of a physical object used as a generator seed. This basic "seed" implementation provides secure authentication provided the selected physical token is unique and remains owned by (or otherwise available to) the user. For example, if the user selects some very common physical object like a coin, other users who also select the same coin would result in the same public/private key pair. Alternatively, an attacker could test physical objects they would expect to be common, or keep a set of public/private key pairs (similar to rainbow tables) of common objects to attack a credential store. To ameliorate or overcome such entropy-based attacks, preferably the generation seed is augmented by a secondary data source to arrive at a key pair that cannot be reproduced from the physical object alone. Primary sources of additional data would be devices already involved in the process, e.g., the user, the mobile device, an application executing on the device or being accessed, the key module, or the like. With reference to FIG. 8, the following describes several method of seed generation, each having different security tradeoffs.

As depicted in FIG. 8, the scenarios may involve a physical object 800, a key module 802, a user and his/her mobile device 804, and the application 806 (or, more generally, the "resource") to which the user devices to be authenticated.

The "Basic seed" approach is based on the physical token alone. This is a straightforward solution susceptible to device theft and entropy-based attacks.

The "User-validated seed" approach combines the physical object data with a passcode or PIN entered by the user. The combined data stream is then used as the key generation seed. This approach has the advantages of overcoming theft and password-based attacks, as long as the user chooses a reasonably complex password. A potential downside is that the same public/private key may be used across multiple sites, which magnifies exposure risk.

A "Reader-specific seed" approach combines physical object data with a unique ID (like MAC address, or a system setting) on any of the involved devices, such as the smartphone or off-loaded key module. This approach has the advantage of overcoming theft of the token and password-based attacks, and also easy adds a large amount of entropy. This solution, however, ties the passkey to the mobile device, which could be undesirable, and that potentially exposes the system to theft risk.

The "Service-specific seed" approach overcomes issues of a user providing the same key pair for multiple services and, in particular, by salting the generation seed with something specific to the application requesting authentication. One example approach is to append the application hostname to the seed. This provides a convenient way to prevent cross-site exposure from the leak of a private key. Even if a private key were exposed and an attacker knew the domain used for key generation, the attacker could not recover the initial seed used to generate the private key (being a one-way generation algorithm); therefore, the attacker cannot leverage the private key as an attack to other sites that used the same physical token.

The "Highly-tuned seed" approach combines any of the above methods and possibly external sources (input as another token, another passkey, another user, etc.).

The above-described techniques have many variants that are within the scope of this disclosure. Thus, a user may select the same physical token for multiple services, but the public and private key generated need not be the same for each service. For example, and as mentioned above, the client device could salt the data generation stream with the hostname of the service being used to thereby generate different keys for each service even based on the same physical token.

The physical token may be multiple combined objects, for example, a penny and a nickel. The data derived from the one or more physical objects may be input serially or first combined. Different conversions (e.g., weight, and 3D profile) may be applied to the same physical object.

A user may register authentication using different physical objects for different scenarios, similar to location-based authentication or risk-based access and step-up authentication. For example, a user authentication from home might use a running shoe, while the same user may authenticate at the office using an office coffee mug.

Use of multiple authenticators does not change the system steps, as authentication would just be handled as multiple registered tokens and configuration options.

The "registration" process described above also may be varied. For example, the initial authentication may leverage existing protocols, such as out-of-band user identification, sending of an OTP (one-time password), sending of a SMS, or even having the user go to a physical location (the bank) to register his or her public key. A customized mobile app (or mobile device function) could also be for initial registration.

As described, the approach herein relies upon conversion technologies that can be used to reliably and repeatedly convert a physical object into a high-entropy unique seed that can be fed into a public/private key generator. This ensures that the main requirements of the object capture (that it be repeatable and result in a large number of possible outcomes (high entropy)) can be assured. For repeatability, the capture system must generate the same numerical value after many iterations, even in different environment conditions such as lighting, barometric pressure, etc. For high entropy, the conversion system much result in a considerable number of significant digits in the captured data, otherwise an attacker could easily brute-force attack the key generation. For example, a 2D photo of the object might not be an optimal capture of the physical object because, for example, a photo of the object from the side would look far different than the photo from above, and any algorithm to generate a number based on the photo would result in different outcomes based on different conditions. A scale (weight) would make a better example for repeatability, by simply weighing the chosen physical object. The scale, however, may output slightly different measurements in different environment conditions (altitude, pressure, dust, and other factors). As a skilled person will appreciate, preferably the system needs to allow for some noise in the measurements.

A straightforward general approach to deal with noise is to round the conversion result to fewer significant digits. For example, if a scale measures a thimble as weighing 2.253193 grams, the result could be rounded to 2.25 to account for measurement error. Preferably, however, more than three significant digits are used, because $10^3$ possible outcomes is likely not a high enough entropy. To address the high entropy requirement, the scale output might be combined with other measurements, such as height, reflectivity, and so forth, to create an aggregate total of significant digits for the conversion measurement.

Figure 9:
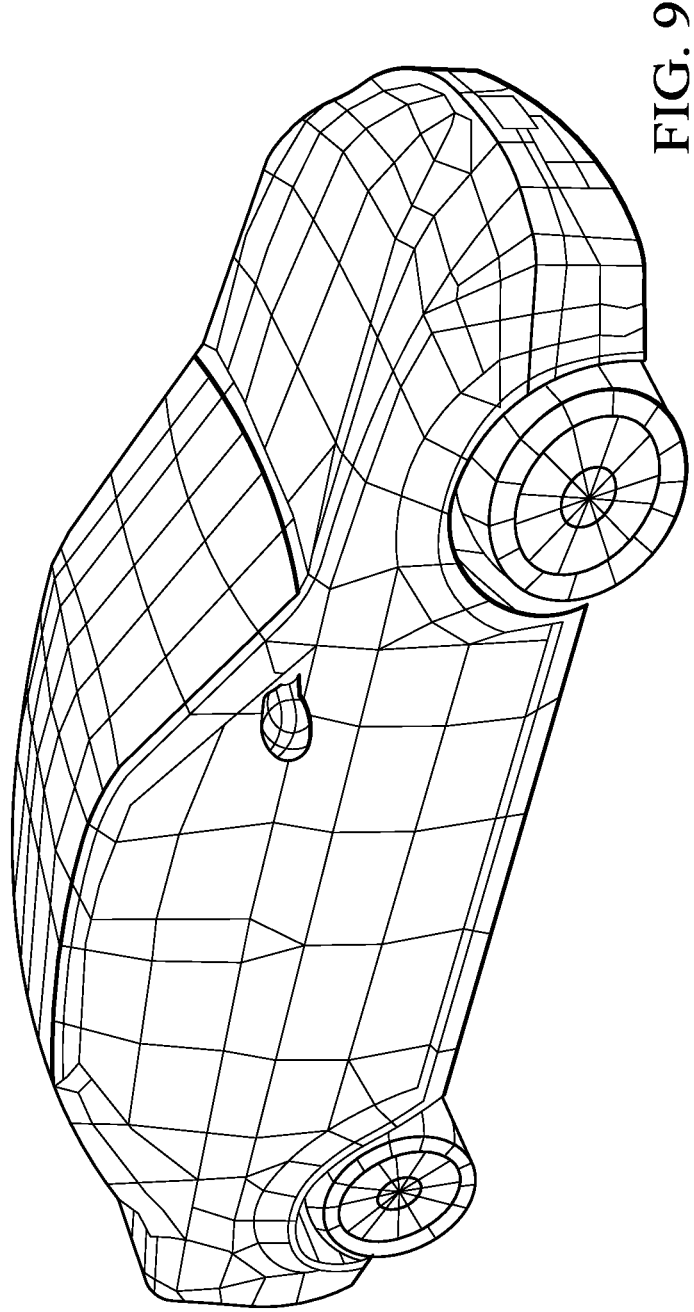
FIG. 9 depicts a 3D capture of a physical object, such as a car.
Figure 10:
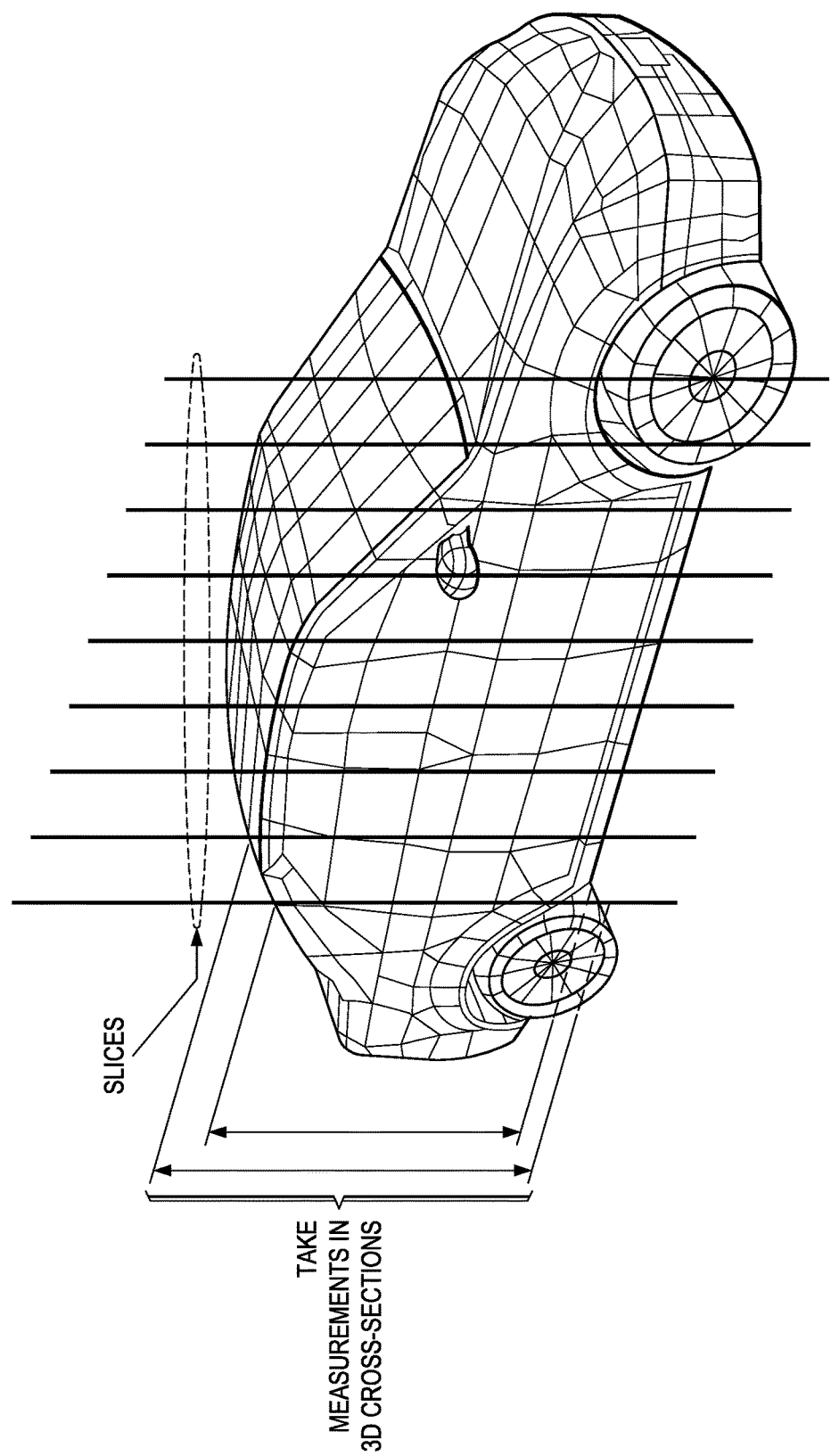
FIG. 10 depicts how the 3D capture data of the physical object may be processed according to a slicing algorithm to generate high entropy digital data for use as the key generator seed.

FIG. 9 depicts a method to create a high entropy solution. This solution leverages 3D capture technology (e.g., a 3D camera) to create a 3D representation of the object. Preferably, multiple measurements are then taken from the 3D representation. To this end, a mobile device with a 3D capture camera is used to create an representation of the physical object, e.g., using a single side view, using a rotating pedestal to capture all sides, or by having the user move the phone around the object. The result is shown in FIG. 9. Once the 3D object is captured, it provides a rich data set from which a large number of measurements can be taken. In this embodiment, each measurement can be rounded with low accuracy to overcome noise, and the aggregate measurements can then be used to create a high-entropy seed to send to the key generator. To this end, and in this example, the mesh is normalized in 3D space, for example, by aligning the most distant two points on the X-axis and the most distant tangential points on the Y-axis (any normalization method can be used as long as it is consistent). The mesh also can be normalized for size in cases where the distance of the 3D camera may be unreliable. The grid that results from this type of normalization is shown in FIG. 10. Then, measures can be taken by analyzing the 3D mesh. For a simple example as shown in FIG. 10, a software solution can slice the mesh into 10 pieces along the x-axis and measure the greatest distance between two points in that slice (all using a relative scale). Then, the conversion application rounds these values up, say, to 2 significant digits, to account for noise. Measurements in the example may be: 0.10, 0.15, 0.22, 0.25, 0.26, 0.26, 0.21, 0.19, 0.10 and 0.09. These multiple measurements can then be combined (concatenated) into ~20 significant digits, e.g.: 01001502202250260260210190100099. This same value can be repeatedly measured using 3D capture, and it would be extremely difficult for an attacker to guess the high-entropy value without having possession of the physical object used to generate the seed. Of course, other mathematical operations (besides concatenation) may be driven by the individual values.

The above-described "slice" solution is an illustrative example, and it is not meant to be the only analysis method. Any repeatable analysis of the mesh (taking by absolute distances, relative distances, measurements based on other measurements, or the like) can be used.

Further, 3D capture is also not the only mechanism that could be used for object capture. It is one preferred approach, however, because it provides good repeatability and entropy, while being readily available.

The above-described provides numerous advantages. Foremost, the approach enables the use of physical objects to generate (or act as) public key authenticators. The approach provides for the user of a secure intermediary (the user's own device(s) in association with the unique physical object) to generate the keys needed for public key-based authentication. The approach leverages highly available "everyday" objects including physical objects, digital objects, or even combinations thereof, to facilitate the generation of the seed value. The conversion of the physical object into digital data may be context-specific or be augmented to include context-specific data to provide further security and flexibility. Thus, conversion of the physical object into digital data based on multiple context-specific qualities in particular can generate highly-secure seed values.

The techniques herein are not limited for use with mobile devices, although that will be a typical implementation.

Generalizing, the functionality described may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. As noted, the techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the functionality on each of the two sides of the visual authentication channel is implemented in software, which includes but is not limited to firmware, resident software, microcode, and the like. As noted above, these functions may be integrated into other applications (such as webmail, document sharing, or the like), or built into software for this specific purpose (of facilitating the visual data exchange channel). Furthermore, the device-specific functionality on either side of the channel can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A computer-readable storage medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the device-specific components are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, a "client-side" application should be broadly construed to refer to an application, a page associated with that application, or some other resource or function invoked by a client-side request to the application. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

As noted above, the mobile device or key module is not limited to any particular device, configuration, or functionality. The techniques may be practiced in any device (distinct from the computing entity) and that is adapted or configured for the purpose of enabling access to a protected resource using the methodology in the manner described above.

The techniques herein provide for improvements to another technology or technical field, namely, computing entities that manage access to resources, as well as improvements to the functioning of access control systems and devices.

The technique herein may be used to generate a seed value for any cryptographic protocol operation, and not just a public/private key generator. Thus, the methodology herein may be used to generate any seed value for any computational process.

As used herein, a "physical object" may refer to actual object itself, or (as in the first embodiment) a digital-only representation of the physical object, such as a photograph thereof.

Having described our invention, what we claim is as follows:

The invention claimed is:

1. A method to enable a user to obtain authenticated access to a resource, comprising:

using a physical object parameter to produce a first digital seed, the physical object parameter having been obtained by sensing a physical object associated with the user at a first time, the physical object parameter defined by a data stream exhibiting high entropy;

augmenting the first digital seed with context-specific information to generate a second seed;

providing at least one of the first and second seeds to a key generator and, in response, receiving a key derived at least in part using the provided seed;

sensing the physical object at a second time to again obtain the physical object parameter;

validating that a component of the key can be derived from the physical object parameter obtained from sensing the physical object at the second time; and upon successful validation, completing an authentication to access the resource.

2. The method as described in claim 1 wherein the key is a key of a key pair, the key pair comprising a public key, and an associated private key.

3. The method as described in claim 1 wherein the data stream is a same set of data generated at the first time from at least two or more iterations of sensing the physical object.

4. The method as described in claim 1 wherein the context-specific information is one of: a device identifier, a user identifier, a web service parameter, and data associated with an application associated with the resource.

5. The method as described in claim 3 wherein the two or more iterations of sensing the physical object are carried out by an input device.

6. The method as described in claim 3 wherein the two or more iterations of sensing the physical object are carried out under different environment conditions.

7. The method as described in claim 1 wherein the key generator is associated with an intermediary device.

8. Apparatus to enable a user to obtain authenticated access to a resource, comprising:

a processor;

computer memory holding computer program instructions executed by the processor, the computer program instructions comprising:

program code configured to use a physical object parameter to produce a first digital seed, the physical object parameter having been obtained by sensing a physical object associated with the user at a first time, the physical object parameter defined by a data stream exhibiting high entropy;

program code configured to augment the first digital seed with context-specific information to generate a second seed;

program code configured to provide at least one of the first and second seeds to a key generator and, in response, to receive a key that is derived at least in part using the provided seed;

program code configured to sense the physical object at a second time to again obtain the physical object parameter;

program code configured to validate that a component of the key can be derived from the physical object parameters obtained from sensing the physical object at the second time; and program code configured upon successful validation to complete an authentication to access the resource.

9. The apparatus as described in claim 8 wherein the key is a key of a key pair, the key pair comprising a public key, and an associated private key.

10. The apparatus as described in claim 8 wherein the data stream is a same set of data generated at the first time from at least two or more iterations of sensing the physical object.

11. The apparatus as described in claim 8 wherein the context-specific information is one of: a device identifier, a user identifier, a web service parameter, and data associated with an application associated with the resource.

12. The apparatus as described in claim 10 wherein the two or more iterations of sensing the physical object are carried out by an input device.

13. The apparatus as described in claim 10 wherein the two or more iterations of sensing the physical object are carried out under different environment conditions.

14. The apparatus as described in claim 8 wherein the key generator is associated with an intermediary device.

15. A computer program product in a non-transitory computer readable storage medium, the computer program product holding computer program instructions executed by a hardware processor to enable a user to obtain authenticated access to a resource, the computer program instructions comprising:

program code configured to use a physical object parameter to produce a first digital seed, the physical object parameter having been obtained by sensing a physical object associated with the user at a first time, the physical object parameter defined by a data stream exhibiting high entropy;

program code configured to augment the first digital seed with context-specific information to generate a second seed;

program code configured to provide at least one of the first and second seeds to a key generator and, in response, to receive a key that is derived at least in part using the provided seed;

program code configured to sense the physical object at a second time to again obtain the physical object parameter;

program code configured to validate that a component of the key can be derived from the physical object parameters obtained from sensing the physical object at the second time; and program code configured upon successful validation to complete an authentication to access the resource.

16. The computer program product as described in claim 15 wherein the key is a key of a key pair, the key pair comprising a public key, and an associated private key.

17. The computer program product as described in claim 15 wherein the data stream is a same set of data generated at the first time from at least two or more iterations of sensing the physical object.

18. The computer program product as described in claim 15 wherein the context-specific information is one of: a device identifier, a user identifier, a web service parameter, and data associated with an application associated with the resource.

19. The computer program product as described in claim 17 wherein the two or more iterations of sensing the physical object are carried out by an input device.

20. The computer program product as described in claim 17 wherein the two or more iterations of sensing the physical object are carried out under different environment conditions.

* * * * *